(12) United States Patent
Hu

(10) Patent No.: US 9,749,857 B2
(45) Date of Patent: Aug. 29, 2017

(54) METHOD AND DEVICE FOR INTERNET PROTOCOL MULTIMEDIA SUBSYSTEM TERMINAL TO ACCESS NETWORK

(71) Applicant: ZTE Corporation, Shenzhen (CN)

(72) Inventor: Yidong Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/442,586

(22) PCT Filed: Jul. 31, 2013

(86) PCT No.: PCT/CN2013/080553
§ 371 (c)(1),
(2) Date: May 13, 2015

(87) PCT Pub. No.: WO2013/174352
PCT Pub. Date: Nov. 28, 2013

(65) Prior Publication Data
US 2016/0227402 A1    Aug. 4, 2016

(30) Foreign Application Priority Data
Nov. 14, 2012    (CN) .......................... 2012 1 0458235

(51) Int. Cl.
*H04L 29/06*        (2006.01)
*H04W 12/06*        (2009.01)
(Continued)

(52) U.S. Cl.
CPC ......... *H04W 12/06* (2013.01); *H04L 63/0876* (2013.01); *H04L 65/1016* (2013.01);
(Continued)

(58) Field of Classification Search
CPC .................. H04L 63/0876; H04L 67/1095
See application file for complete search history.

(56) References Cited

U.S. PATENT DOCUMENTS 7,995,990 B1* 8/2011 Andreasen ........... G06Q 20/102
455/405
8,098,659 B2* 1/2012 Shida ................. H04L 61/2046
370/351

(Continued)

FOREIGN PATENT DOCUMENTS

CN    101222763 A    7/2008
CN    101395932 A    3/2009

(Continued)

OTHER PUBLICATIONS

International Search Report for corresponding application PCT/CN2013/080553 filed Jul. 31, 2013; Mail date Oct. 31, 2013.

(Continued)

*Primary Examiner* — Ali Shayanfar
(74) *Attorney, Agent, or Firm* — Cantor Colburn LLP

(57) ABSTRACT

Provided are a method and device for an IMS terminal to access a network. The method includes that: a home location IMS terminal management system of the IMS terminal acquires IMS network access point information of a visit location from a visit location IMS terminal management system of the IMS terminal, wherein the IMS terminal management systems synchronize their respective data via an interface; and the home location IMS terminal management system sends configuration information to the IMS terminal, wherein the configuration information includes the acquired IMS network access point information. In the disclosure, the home location IMS terminal management system of the IMS terminal acquires the access point information of the visit location, and sends to the IMS terminal configuration information including the access point information, thus enabling the access point acquired by the IMS terminal to be more accurate, and improving the security of an IMS network.

16 Claims, 5 Drawing Sheets

(51) Int. Cl.
  *H04W 8/12*  (2009.01)
  *H04W 8/20*  (2009.01)
  *H04L 29/08*  (2006.01)
  *H04W 48/08*  (2009.01)
  *H04W 60/00*  (2009.01)

(52) U.S. Cl.
  CPC ...... *H04L 65/1083* (2013.01); *H04L 67/1095* (2013.01); *H04W 8/12* (2013.01); *H04W 8/20* (2013.01); *H04W 48/08* (2013.01); *H04W 60/00* (2013.01)

(56) References Cited

U.S. PATENT DOCUMENTS

| | | | | |
|---|---|---|---|---|
| 8,606,940 | B2 * | 12/2013 | Dighe | H04L 29/12028 709/227 |
| 2003/0140283 | A1 * | 7/2003 | Nishio | H04L 29/12018 714/43 |
| 2006/0121924 | A1 * | 6/2006 | Rengaraju | H04N 7/142 455/518 |
| 2008/0084867 | A1 * | 4/2008 | Foti | H04N 7/17336 370/352 |
| 2008/0227451 | A1 * | 9/2008 | Fukui | H04W 8/12 455/435.1 |
| 2009/0052415 | A1 * | 2/2009 | Ishii | H04W 40/20 370/338 |
| 2009/0116447 | A1 | 5/2009 | Balasubramanian | |
| 2010/0048174 | A1 * | 2/2010 | Osborn | H04L 63/08 455/411 |
| 2011/0051701 | A1 * | 3/2011 | Cai | H04L 65/1016 370/338 |
| 2011/0060771 | A1 * | 3/2011 | Llorente | H04L 29/12132 707/812 |
| 2011/0075655 | A1 * | 3/2011 | Sahin | H04L 65/1016 370/352 |
| 2011/0305196 | A1 * | 12/2011 | Kurokawa | H04W 8/12 370/328 |
| 2012/0033610 | A1 * | 2/2012 | Ring | H04L 67/141 370/328 |
| 2012/0083267 | A1 | 4/2012 | Sharp | |
| 2012/0185506 | A1 * | 7/2012 | Gomez Maturana | H04L 67/10 707/769 |
| 2012/0185604 | A1 * | 7/2012 | Shatsky | H04L 67/306 709/228 |
| 2012/0311330 | A1 * | 12/2012 | Zhang | H04L 63/0815 713/168 |
| 2012/0317252 | A1 * | 12/2012 | Vemulapalli | H04L 61/2046 709/221 |
| 2013/0065606 | A1 * | 3/2013 | Kurokawa | H04L 65/1006 455/456.1 |
| 2013/0347072 | A1 * | 12/2013 | Dinha | H04L 63/0272 726/4 |
| 2014/0003337 | A1 * | 1/2014 | Majmundar | H04W 48/06 370/328 |
| 2016/0100306 | A1 * | 4/2016 | Brianza | H04W 8/04 455/433 |

FOREIGN PATENT DOCUMENTS

| | | |
|---|---|---|
| CN | 101448245 A | 6/2009 |
| WO | 2010133238 A1 | 11/2010 |
| WO | 2012050261 A1 | 4/2012 |

OTHER PUBLICATIONS

European Search Report for corresponding application EP 13 79 3309; Report dated Dec. 8, 2015.

* cited by examiner

METHOD AND DEVICE FOR INTERNET PROTOCOL MULTIMEDIA SUBSYSTEM TERMINAL TO ACCESS NETWORK

TECHNICAL FIELD

The disclosure relates to the field of communications, including e.g., a method and device for an Internet Protocol Multimedia Subsystem (IMS) terminal to access a network.

BACKGROUND

An IMS network requires that an IMS terminal can achieve roam control access, which is like a wireless mobile terminal, so as to reduce operations like opening an account, closing an account, relocating or changing number when a user moves the IMS terminal.

A user name and a password are generated when a user opens an account in a business hall; after the user powers a terminal on, the user manually inputs the user name and the password on a terminal interface. After inputting the user name and the password, the user logs in and registers at a control system. When the user does not open an account at the control system, or the user name and the password are wrong, or the terminal is in a roaming state, the control system directly returns a registration failure message to the terminal.

An existing IMS terminal management system judges by comparing an Internet Protocol (IP) address by which the terminal accesses and the configuration data of the system, based on that a judgment result is that the condition does not be matched, the system determines that the terminal is beyond the roam control area, it is not allowed to log in an IMS core network or to issue the configuration information to log in the IMS core network.

A method for controlling roam and configuring data for the existing IMS terminal management system is as follows:

all regions within an area that the system can control are configured on the system; the regions can be configured based on four levels, namely country, province, city and county; each district in each level of the region is configured with IP network segments of this region; at the same time, one or more areas out of control are configured, and the IP network segments of the one or more areas out of control are set; and a roam control policy of the terminal account is set on a terminal account.

When delivery, a terminal is uniformly set with a domain name address of the IMS terminal management system according to the requirements of IMS operators; when the terminal is powered on to register anywhere, it registers in the IMS terminal management system according to the set domain name and acquires the IMS service configuration information.

The terminal will acquire the IP address of an access location when registering in the IMS terminal management system; the system acquires the roam control policy of terminal account information according to the account and password of the terminal; the system matches the IP address of a registration access location with the IP address configured on a region to acquire the region information; the acquired region and opened-account region is matched with the roam control policy of the terminal account, and when the roam control policy is not matched, the registration is failed.

There are two control ways for the terminal roaming in the IMS network: Internet Protocol Connectivity Access Network (IP-CAN) roam and IMS roam.

Wherein, the IP-CAN roam is actually that the terminal accesses the IMS network of a home location through network.

The IMS roam access includes: General Packet Radio Service (GPRS), The Third Generation Mobile Communications (3G) access, and Wireless Local Area Network (WLAN) access, cable/Digital Subscriber Line (cable/xDSL) wired access.

The GPRS and 3G access way to register in the IMS network through a Serving General Packet Radio Service Support Node (SGSN) is performed by adhering to the IP-CAN network. The WLAN access way and the cable/xDSL access way is performed by finding a Proxy-Call Session Control Function (P-CSCF) domain name by a Dynamic Host Configure Protocol (DHCP) server, and analyzing the P-CSCF domain name by a Domain Name Server (DNS) and returning the analyzed P-CSCF domain name to the terminal, and then accessing the IMS network by the terminal according to a P-CSCF address.

There are two roam ways in the existing IMS terminal management system: trans-regional roam in the management system and trans-management system roam outside the management system. FIG. 1 is a schematic diagram that the IMS terminal accesses to a network in a roam way according to related art; as shown in FIG. 1, 1 represents the current computer network, 2 represents the scope of area controlled by the IMS terminal management system 1, 3 represents the scope of area controlled by the IMS terminal management system 2, 4 represents the IMS terminal management system 1, 5 represents the IMS terminal management system 2, 6 represents the process of roaming from the region 1 to the region b, 7 represents the process that a Terminal Station (TS) registers in the IMS terminal management system 1 through the computer network, and 8 represents the process that the TS receives the configuration information issued by the IMS terminal management system 1. The above two roam ways are described below with reference to FIG. 1.

The trans-regional roam in the management system is that: the TS roams from the region 1 to the region 2 in an area controlled by the IMS terminal management system 1. When the IMS terminal management system 1 determines that the user passes the authentication in the region 2 according to the IP address by which the TS accesses, the IMS terminal management system 1 issues the IMS proxy server address information configured on the region 2 to the TS, and the TS accesses nearby according to the issued IMS proxy server address information.

The trans-management system roam outside the management system is that: the TS roams from the region 1 controlled by the IMS terminal management system 1 to the region b controlled by the IMS terminal management system 2. When the terminal performs the registration in the home location IMS terminal management system 1, the IMS terminal management system 1 determines, according to the IP address by which the IMS terminal accesses, that the region of the roam location is not in the area administered by the system, and then the IMS terminal management system 1 uses the IP address to match data stored by a home location management system to acquire proxy access point Base Station Controller (BSC) information and service information and issues these information to the TS.

However, there are the following problems in the roam control method and IMS network roam method according to the existing IMS terminal management system:

firstly, the information such as the address of a remote proxy access point is not accurately configured in the IMS terminal management system, and the terminal cannot acquire an accurate access point;

secondly, because the domain name of each visit IMS network is different, and the domain name of the IMS terminal management system is different too, the initialization of the IMS terminal is difficult, and the configuration of terminal data is complicated, so it is not conducive to the promotion;

thirdly, in the IP-CAN roam way, the terminal directly accesses a home location IMS network through an IP network, which cannot ensure the Quality of Service (QoS) of a communication network; in the WLAN access way and the cable/xDSL access way, the DHCP server needs to be modified, and the IMS terminal cannot access the IMS network without the DHCP; and finally, the service roaming management cannot be provided for the terminal.

Aiming at the problems in related art that a terminal cannot acquire an accurate access point and the service roaming management cannot be provided for the terminal, an effective solution has not been presented yet.

SUMMARY OF THE INVENTION

A method and device for an IMS terminal to access a network are provided in the disclosure, for at least solving the problems in related art that a terminal cannot acquire an accurate access point and the service roaming management cannot be provided for the terminal.

According to an aspect of the disclosure, a method for an Internet Protocol Multimedia Subsystem, IMS, terminal to access a network, comprising: acquiring, by a home location IMS terminal management system of the IMS terminal, IMS network access point information of a visit location from a visit location IMS terminal management system of the IMS terminal, wherein IMS terminal management systems synchronize their respective data via an interface; and sending, by the home location IMS terminal management system, configuration information to the IMS terminal, wherein the configuration information comprises the acquired IMS network access point information.

According to an embodiment of the disclosure, acquiring by the home location IMS terminal management system of the IMS terminal, the IMS network access point information of the visit location from the visit location IMS terminal management system of the IMS terminal comprises: receiving, by the home location IMS terminal management system, a registration request from the IMS terminal; and acquiring, by the home location IMS terminal management system, the IMS network access point information of the visit location from the visit location IMS terminal management system according to the registration request.

According to an embodiment of the disclosure, by the home location IMS terminal management system, the IMS network access point information of the visit location from the visit location IMS terminal management system according to the registration request comprises: after the home location IMS terminal management system authenticates that the IMS terminal is valid according to the registration request, determining, by the home location IMS terminal management system, the visit location IMS terminal management system according to an Internet Protocol, IP, address by which the IMS terminal accesses; sending, by the home location IMS terminal management system, an IMS network access point information request message to the visit location IMS terminal management system; and receiving, by the home location IMS terminal management system, the IMS network access point information and service information of the visit location from the visit location IMS terminal management system.

According to an embodiment of the disclosure, before sending, by the home location IMS terminal management system, the configuration information to the IMS terminal, the method further comprises: integrating according to a predetermined policy of the IMS terminal, by the home location IMS terminal management system, the service information of the visit location, the IMS network access point information and information of services opened for the IMS terminal, which is stored by the home location IMS terminal management system, and generating the configuration information.

According to an embodiment of the disclosure, when there are multiple different accounts for the IMS terminal and after the IMS terminal has successfully registered in a home location IMS terminal management system of one account, when a current account with a home location different from that of the account is applied to perform registering, before acquiring, by the home location IMS terminal management system of the IMS terminal, the IMS network access point information of the visit location from the visit location IMS terminal management system, the method further comprises: receiving, by the registered home location IMS terminal management system, a registration request from the IMS terminal, and determining a home location IMS terminal management system of the current account according to the registration request; initiating, by the registered home location IMS terminal management system, an identity authentication request to the home location IMS terminal management system of the current account; based on that identity authentication is successful, acquiring, by the registered home location IMS terminal management system, service information of the current account from the home location IMS terminal management system of the current account, and acquiring the IMS network access point information of the visit location from the visit location IMS terminal management system; based on that the identity authentication is unsuccessful, ending a registration, wherein the IMS terminal disconnects from the registered home location IMS terminal management system.

According to an embodiment of the disclosure, when there are multiple different accounts for the IMS terminal and after the IMS terminal has successfully registered in a home location IMS terminal management system of one account, when a current account with a home location different from that of the account is applied to perform registering, before acquiring, by the home location IMS terminal management system of the IMS terminal, the IMS network access point information of the visit location from the visit location IMS terminal management system, the method further comprises: receiving, by the registered home location IMS terminal management system, a registration request from the IMS terminal, and determining a home location IMS terminal management system of the current account according to the registration request; issuing, by the registered home location IMS terminal management system, domain name information of the home location IMS terminal management system of the current account to the IMS terminal; and receiving, by the home location IMS terminal management system of the current account, the registration request from the IMS terminal.

According to an embodiment of the disclosure, when the home location IMS terminal management system fails to acquire the IMS network access point information, the home location IMS terminal management system directly issues IMS network access point information of the home location to the IMS terminal, wherein the IMS terminal accesses an IMS network according to the IMS network access point information of the home location.

According to an embodiment of the disclosure, the IMS terminal management system configures account information, service data and administered IP network segment of all terminals administered by the IMS terminal management system, and configures domain name, administered IP network segment and system feature code of one or more IMS terminal management systems corresponding to the terminals.

According to an embodiment of the disclosure, before acquiring, by the home location IMS terminal management system, the IMS network access point information of the visit location from the visit location IMS terminal management system, the method further comprises: receiving, by an IMS terminal management system, a request for synchronizing and/or updating data from other IMS terminal management systems, and checking validity of the data requested to be synchronized; based on that the data requested to be synchronized is valid, checking, by the IMS terminal management system, whether the data requested to be synchronized is in conflict with existing data; based on that the data requested to be synchronized is invalid, returning, by the IMS terminal management system, failure information to said other IMS terminal management systems; based on that the data requested to be synchronized is not in conflict with the existing data, automatically updating, by the IMS terminal management system, the data requested to be synchronized; based on that the data requested to be synchronized is in conflict with the existing data, sending, by the IMS terminal management system, node information which is in conflict to said other IMS terminal management systems, wherein said other IMS terminal management systems resynchronize data after adjusting data.

According to an embodiment of the disclosure, before receiving, by the IMS terminal management system, the request for synchronizing and/or updating the data from other IMS terminal management systems, the method further comprises: checking, by the IMS terminal management system, whether there is conflict in the IP network segment of the IMS terminal management system, and based on that there is no conflict in the IP network segment, splitting the IP network segment and validating the split IP network segment.

According to an embodiment of the disclosure, the IMS network access point information is Base Station Controller, BSC, address information corresponding to the IP address by which the IMS terminal accesses a IMS network.

According to another embodiment of the disclosure, a device for an Internet Protocol Multimedia Subsystem (IMS) terminal to access a network, which is applied to an IMS terminal management system, comprising: an acquiring component, is configured to acquire IMS network access point information of a visit location from a visit location IMS terminal management system of the IMS terminal, wherein IMS terminal management systems synchronize their respective data via an interface; and a sending component, configured to send configuration information to the IMS terminal, wherein the configuration information comprises the acquired IMS network access point information.

According to an embodiment of the disclosure, the device further comprising: an integrating component, configured to integrate, according to a predetermined policy of the IMS terminal, service information of the visit location, the IMS network access point information and information of services opened for the IMS terminal, which is stored by the home location IMS terminal management system; and a generating component, configured to generate the configuration information.

Through the disclosure, the IMS terminal management systems synchronize respective data via an interface; when roaming, the home location IMS terminal management system of the IMS terminal acquires the IMS network access point information about the visit location from the visit location IMS terminal management system of the IMS terminal, and the home location IMS terminal management system sends the configuration information to the IMS terminal, wherein the configuration information includes the acquired IMS network access point information; thus, the problems in related technologies that a terminal cannot acquire an accurate access point and opened service roaming management cannot be provided for the terminal are solved, an IMS network access point acquired by the IMS terminal is enabled to be more accurate, service roaming management is achieved, and the security of an IMS network is improved.

BRIEF DESCRIPTION OF THE DRAWINGS

The accompanying drawings described here are used for providing a deeper understanding of the disclosure, and constitute a part of the application; schematic embodiments of the disclosure and description thereof are used for illustrating the disclosure and not intended to form improper limit to the disclosure. In the accompanying drawings.

DETAILED DESCRIPTION OF THE EMBODIMENTS

Note that, embodiments and features in embodiments in the application can be combined with each other when there is no conflict. The example embodiment of the disclosure is elaborated below with reference to the accompanying drawings and in combination with embodiments.

Figure 1:
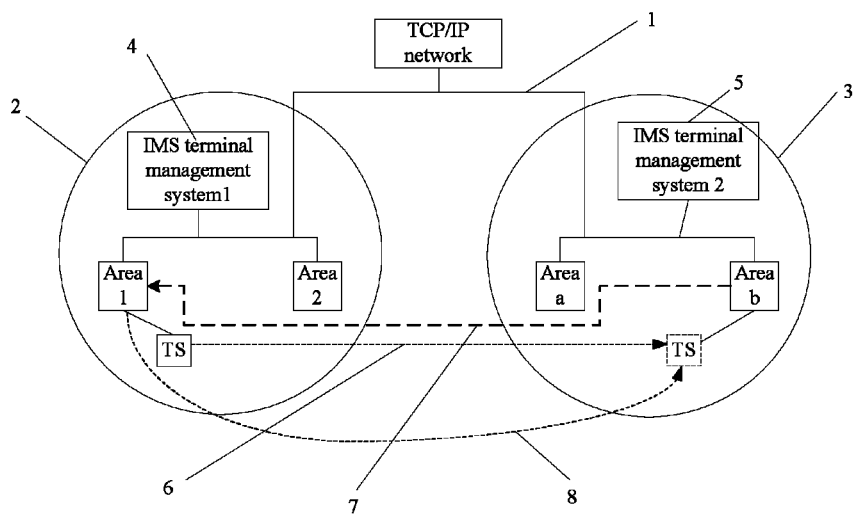
FIG. 1 is a schematic diagram that an IMS terminal accesses to a network in a roam way according to related art.
Figure 2:
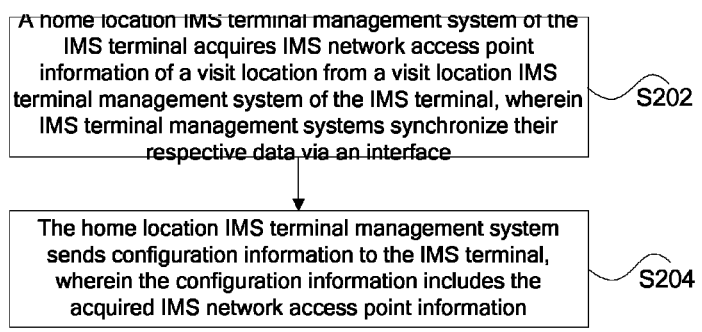
FIG. 2 is a flowchart of a method for the IMS terminal to access the network according to an example embodiment of the disclosure.

A method for an IMS terminal to access a network is provided in the example embodiment of the disclosure; FIG. 2 is a flowchart of the method for the IMS terminal to access the network according to an example embodiment of the disclosure; as shown in FIG. 2, the method includes the following steps:

Step 202: a home location IMS terminal management system of the IMS terminal acquires IMS network access point information of a visit location from a visit location IMS terminal management system of the IMS terminal, wherein the IMS terminal management systems synchronize data via an interface; and Step 204: the home location IMS terminal management system sends configuration information to the IMS terminal, wherein the configuration information includes the acquired IMS network access point information.

Through the above steps, the IMS terminal management systems synchronize data via an interface; when roaming, the home location IMS terminal management system of the IMS terminal acquires the IMS network access point information of the visit location from the visit location IMS terminal management system of the IMS terminal, and the home location IMS terminal management system sends the configuration information to the IMS terminal, wherein the configuration information includes the acquired IMS network access point information; it is solved the problems in related art that a terminal cannot acquire an accurate access point and the service roaming management cannot be provided for the terminal, thus enabling the IMS network access point acquired by the IMS terminal to be more accurate, achieving the service roaming management, and improving the security of an IMS network.

In Step 202, there are many ways for the home location IMS terminal management system of the IMS terminal to acquire the IMS network access point information of the visit location from the visit location IMS terminal management system of the IMS terminal; an example way is provided below, including that: the home location IMS terminal management system receives a registration request from the IMS terminal; and the home location IMS terminal management system acquires the IMS network access point information of the visit location from the visit location IMS terminal management system according to the registration request. This way can save system expenses.

Wherein, there are also many ways for the home location IMS terminal management system to acquire the IMS network access point information of the visit location from the visit location IMS terminal management system according to the registration request. In an implementation process, in order to ensure the security of a network side, a lot of information of an IMS core network cannot be disclosed to the IMS terminal. There is an example implementation way for the home location IMS terminal management system to acquire the IMS network access point information of the visit location from the visit location IMS terminal management system according to the registration request in the following, including that: after the home location IMS terminal management system authenticates that the IMS terminal is valid according to the registration request, the home location IMS terminal management system determines the visit location IMS terminal management system according to an IP address by which the IMS terminal accesses; the home location IMS terminal management system sends an IMS network access point information request message to the visit location IMS terminal management system; and the home location IMS terminal management system receives the IMS network access point information and service information of the visit location from the visit location IMS terminal management system. In this example implementation way, the domain name (IP address) of the IMS terminal management system is disclosed to the IMS terminal, and other information of the IMS core network does not be disclosed to the IMS terminal device, thereby improving the security of an IMS network.

In Step 204, before the home location IMS terminal management system sends the configuration information to the IMS terminal, the following step may further be included: the home location IMS terminal management system integrates, according to the predetermined policy of the IMS terminal, the service information of the visit location, the IMS network access point information and information of services opened for the IMS terminal, which is stored by the home location IMS terminal management system, and generates the configuration information. In this method, the services information of the IMS terminal opened at the home location is acquired, and the service information of the home location and the service information of the visit location is integrated to generate the configuration information together with other information, thereby achieving the support for opening the service roaming management provided for the terminal.

In a practical application, there may be multiple different accounts for the IMS terminal. After the IMS terminal has successfully registered in the home location IMS terminal management system of one account, the IMS terminal might need to use a current account with a home location different from that of the account to register. An example way for implementing roam control based on that the above condition is presented below.

(1) The home location IMS terminal management system of the current account takes charge of the identity authentication, and returns information to the registered home location IMS terminal management system of a registered account; then the IMS terminal management system of the registered account acquires the access point information of the visit location; this way can be implemented by the following steps: before the home location IMS terminal management system of the IMS terminal acquires the IMS network access point information of the visit location from the IMS terminal management system of the visit location, the registered home location IMS terminal management system receives a registration request from the IMS terminal, and determines the home location IMS terminal management system of the current account according to the registration request; the registered home location IMS terminal management system initiates an identity authentication request to the home location IMS terminal management system of the current account; based on that the identity authentication is successful, the registered home location IMS terminal management system acquires the service information of the current account from the home location IMS terminal management system of the current account and acquires the IMS network access point information of the visit location from the visit location IMS terminal management system; and based on that the identity authentication is unsuccessful, the registration ends, and the IMS terminal disconnects from the registered home location IMS terminal management system. Herein, the registered home location IMS terminal management system sends the service information and the access point information to the IMS terminal, and then the IMS terminal can access an IMS network according to the access point information and use services according to the service information.

(2) The IMS terminal acquires domain name information of the home location IMS terminal management system of the current account through the IMS terminal management system of the registered account, and the IMS terminal management system of the current account acquires the access point information of the visit location; this way can be implemented by the following steps: before the home location IMS terminal management system of the IMS terminal acquires the IMS network access point information of the visit location from the visit location IMS terminal management system, the registered home location IMS terminal management system receives a registration request from the IMS terminal and determines the home location IMS terminal management system of the current account according to the registration request; the registered home location IMS terminal management system issues domain name information of the home location IMS terminal management system of the current account to the IMS terminal; and the home location IMS terminal management system of the current account receives the registration request from the IMS terminal. Herein, the IMS terminal directly registers the home location IMS terminal management system of the current account. The home location IMS terminal management system of the current account acquires the access point information from the visit location IMS terminal management system. The IMS terminal can access an IMS network according to the access point information sent by the home location IMS terminal management system of the current account and use services according to the service information.

The above is the two example processing ways provided when there are multiple accounts for the IMS terminal registering in the IMS terminal management system; in a practical application, the processing ways can be chosen according to requirements, which is flexible and improves practicality of the IMS terminal management system.

In the above steps, when the home location IMS terminal management system fails to acquire the IMS network access point information, the home location IMS terminal management system directly issues the IMS network access point information of the home location to the IMS terminal, and the IMS terminal can access an IMS network according to the IMS network access point information of the home location. This method provides a solution when the IMS terminal management system runs unstably, which enables the IMS terminal management system to continue providing services and improves availability of the IMS terminal management system.

For enabling the IMS terminal to access the network better, before Step 202, the following step may further be included: the IMS terminal management system configures account information, service data and administered IP network segment of all the terminals administered by the IMS terminal management system, and configures domain name, administered IP network segment and system feature code of one or more IMS terminal management systems corresponding to the terminals. It can facilitate the initialization and the data configuration of the IMS terminal, which provides support for synchronizing data between different IMS terminal management systems.

Because the domain name of each IMS network is different, the domain name of the IMS terminal management system is different too, which always results that the initialization of the IMS terminal is difficult and the data configuration of the IMS terminal is complex. An example way is provided to solve the above problem. That is, before the home location IMS terminal management system acquires the IMS network access point information of the visit location from the visit location IMS terminal management system, this way further includes that: the IMS terminal management system receives a request for synchronizing and/or updating data from other IMS terminal management systems, and checks the validity of the data requested to be synchronized; based on that the data requested to be synchronized is valid, the IMS terminal management system checks whether the data requested to be synchronized is in conflict with the existing data; based on that the data requested to be synchronized is invalid, the IMS terminal management system returns failure information to said other IMS terminal management systems; based on that the data requested to be synchronized is not in conflict with the existing data, the IMS terminal management system automatically updates the data requested to be synchronized; based on that the data requested to be synchronized is in conflict with the existing data, the IMS terminal management system sends the node information which is in conflict to said other IMS terminal management systems, and said other IMS terminal management systems resynchronize data after adjusting data. It is achieved in the method that the different IMS terminal management systems synchronize data, which facilitates the initialization of the terminal and the data configuration of the IMS terminal, and benefits the development and application of IMS network.

Wherein, before the IMS terminal management system receives the request for synchronizing and/or updating the data from other IMS terminal management systems, the following step may further be included: the IMS terminal management system checks by itself whether there is conflict in the IP network segment, and based on that there is no conflict in the IP network segment, the IP network segment is split and the split IP network is validated. It benefits to synchronize data between the different IMS terminal management systems in the method. In a practical application, the IMS terminal management system can automatically split the IP network segment.

Note that, the IMS network access point information in the above content can be the BSC address information corresponding to the IP address by which the IMS terminal accesses.

Figure 3:
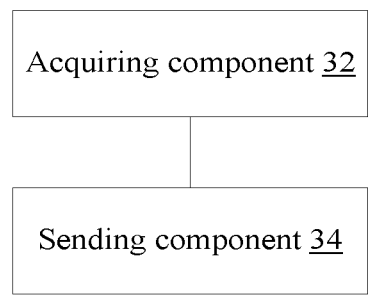
FIG. 3 is a structure diagram of the device for the IMS terminal to access the network according to an example embodiment of the disclosure.

A device for an IMS to access a network is provided in the example embodiment of the disclosure, which can be configured to implement the method for the IMS terminal to access a network. FIG. 3 is a structure diagram of the device for the IMS terminal to access the network according to an example embodiment of the disclosure; as shown in FIG. 3, the device includes: an acquiring component 32 and a sending component 34; the acquiring component 32 is configured to acquire the IMS network access point information of a visit location from a visit location IMS terminal management system of the IMS terminal, wherein the IMS terminal management systems synchronize data via an interface; the sending component 34 is coupled to the acquiring component 32 and configured to send configuration information to the IMS terminal, wherein the configuration information includes the acquired IMS network access point information.

Through the above device, the acquiring component 32 acquires the IMS network access point information of the visit location from the visit location IMS terminal management system of the IMS terminal, wherein the IMS terminal management systems synchronize data via an interface; the sending component 34 sends the configuration information to the IMS terminal, wherein the configuration information includes the acquired IMS network access point information; it is solved the problems in the related art that a terminal cannot acquire an accurate access point and the service roaming management cannot be provided for the terminal, thus the IMS network access point chosen by the IMS terminal being more accurate, achieving the service roaming management, and improving the security of an IMS network.

Figure 4:
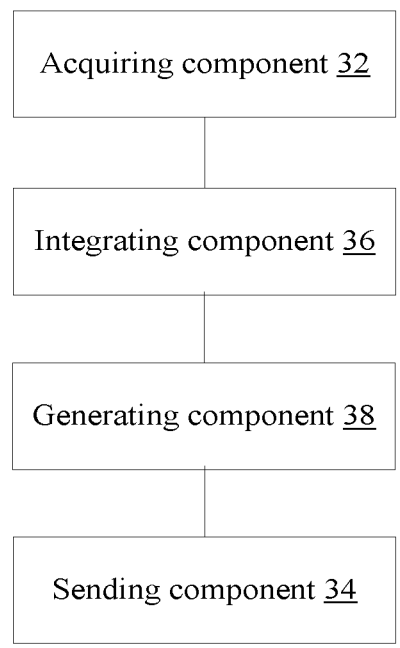
FIG. 4 is a structure diagram 1 of a device for the IMS terminal to access the network according to an example embodiment of the disclosure.

FIG. 4 is a structure diagram 1 of the device for the IMS terminal to access the network according to an example embodiment of the disclosure; as shown in FIG. 4, beside all the components shown in FIG. 3, the device may further include: an integrating component 36 and a generating component 38; wherein, the integrating component 36 is coupled to the acquiring component 32 and configured to integrate, according to the predetermined policy of the IMS terminal, the service information of the visit location, the IMS network access point information and information of services subscribed to by the IMS terminal, which is stored by the home location IMS terminal management system; the generating component 38 is coupled to the integrating component 36 and configured to generate the configuration information.

Optionally, the acquiring component 32 includes: a first receiving element, which is configured to receive the registration request from the IMS terminal; and an acquiring element, which is coupled to the first receiving element and configured to acquire the IMS network access point information of the visit location from the visit location IMS terminal management system.

Optionally, the acquiring component 32 further includes: a determining element, which is configured to, after authenticating that the IMS terminal is valid according to the registration request, determine the visit location IMS terminal management system according to the IP address by which the IMS terminal accesses; a sending element, which is coupled to the determining element and configured to send an IMS network access point information request message to the visit location IMS terminal management system; and a second receiving element, which is coupled to the sending element and configured to receive the IMS network access point information and the service information of the visit location from the visit location IMS terminal management system.

Optionally, when there are multiple different accounts for the IMS terminal and after the IMS terminal has successfully registered in a home location IMS terminal management system of one account, when a current account with a home location different from that of the account is applied to perform registering, and the IMS terminal management system to which the above device belongs serves as the system of the registered account, the above device further includes: a first receiving component, which is configured to receive the registration request from the IMS terminal and determine the home location IMS terminal management system of the current account according to the registration request; an initiating component, which is coupled to the first receiving component and configured to initiate an identity authentication request to the home location IMS terminal management system of the current account; and a first processing component, which is coupled to the initiating component and configured to, under the condition that the identity authentication is successful, acquire the service information of the current account from the home location IMS terminal management system of the current account and acquire the IMS network access point information of the visit location from the visit location IMS terminal management system; and based on that the identity authentication is unsuccessful, the registration ends, and the IMS terminal disconnects from the registered home location IMS terminal management system.

Optionally, when there are multiple different accounts for the IMS terminal and after the IMS terminal has successfully registered in the home location IMS terminal management system of one account, when a current account with a home location different from that of the account is applied to perform registering, and the IMS terminal management system to which the above device belongs serves as system of the registered account, the above device further includes: a second receiving component, which is configured to receive the registration request from the IMS terminal and determine the home location IMS terminal management system of the current account according to the registration request; and an issuing component, which is coupled to the second receiving component and configured to issue domain name information of the home location IMS terminal management system of the current account to the IMS terminal; at this point, the home location IMS terminal management system of the current account receives the registration request from the IMS terminal.

Optionally, when the home location IMS terminal management system fails to acquire the IMS network access point information, the home location IMS terminal management system directly issues the IMS network access point information of the home location to the IMS terminal, and the IMS terminal accesses an IMS network according to the IMS network access point information of the home location.

Optionally, the IMS terminal management system configures account information, service data and administered IP network segment of all terminals administered by the IMS terminal management system, and configures domain name, administered IP network segment and system feature code of one or more IMS terminal management systems corresponding to the terminals.

Optionally, the above device further includes: a synchronizing component, which is configured to receive a request for synchronizing and/or updating data from other IMS terminal management systems and check the validity of the data requested to be synchronized; a second processing component, which is coupled to the synchronizing component and configured to, under the condition that the data requested to be synchronized is valid, check whether the data requested to be synchronized is in conflict with existing data; under the condition that the data requested to be synchronized is invalid, return failure information to other IMS terminal management systems; an updating component, which is coupled to the second processing component and configured to, under condition that the data requested to be synchronized is not in conflict with the existing data, automatically update the data requested to be synchronized; and a second sending component, which is configured to, under the condition that the data requested to be synchronized is in conflict with the existing data, send node information in conflict to other IMS terminal management systems, wherein other IMS terminal management systems resynchronize data after adjusting data.

Note that, the device for the IMS terminal to access the network described in the embodiment of the device corresponds to the above embodiment of the method, and its specific implementation process has been elaborated in the embodiment of the method, so it will not be repeated here.

For making the technical solution and implementation method of the disclosure clearer, the implementation process is elaborated below in combination with the preferred embodiments.

Example Embodiment 1

In the present example embodiment, a method for roam control and intelligent data adjustment for the IMS terminal is as follows.

A two-way synchronous interface for data communication is added among the IMS terminal management systems; this interface is applied for managing IP network segment synchronization and information acquiring among the systems.

The IMS terminal management system configures node information of an opposite end IMS terminal management system, wherein the node information includes domain name, administered IP network segment and system feature code of the opposite end system; the account information, service data and administrated IP network segment of all the terminals administrated by the IMS terminal management system are configured; all the IP network segments are shared among the systems and adjusted automatically; the domain name of the system is configured on both a Domain Name Server (DNS) of a public network and a DNS of a private network of an operator, and disclosed on the public network; wherein, when a DNS domain name of the private network is resolved, the domain names of all the related systems are resolved to an IP address of a nearby terminal management system.

There can be two ways for the IMS terminal to register in the IMS terminal management system: one is accessing a nearby roam location (namely the visit location) IMS terminal management system; and other is accessing the roam location IMS terminal management system through the home location. Wherein, for the first way, when the IMS terminal can access the nearby IMS terminal management system of the visit location, the visit location IMS terminal management system is authenticated by the home location IMS terminal management system according to the registration request from the terminal; when the identity of the visit location IMS terminal management system is valid, the service information of the account is acquired from the home location. For the second way, when the IMS terminal registers in the home location IMS terminal management system, after the home location IMS terminal management system authenticates that the IMS terminal is valid, the visit location IMS terminal management system acquires service information of this location and IMS access point BSC information from the home location IMS terminal management system according to register information of the terminal.

The IMS terminal management system that the terminal accesses integrates the acquired information and locally stored information according to a policy and issues the integrated information to the IMS terminal; then, the IMS terminal accesses an IMS network and uses the opened services according to the integrated information.

Through the above steps, all the IMS terminals acquire a best IMS network access point via the IMS terminal management system; there is no any limit to the terminal to access a network, thereby solving the problem that a roam access point of the IMS terminal is not accurate, and enabling the acquired IMS network access point to be more accurate; the two-way synchronous interface for data communication is added among the IMS terminal management systems. It is solved the problem that setting for the terminal to register is complex, thus enabling the setting for the terminal to register to be simpler, and enabling implementation of the terminal to be more simpler; it is solved the problems that a network with a fix IP address cannot be accessed and roam management cannot be provided for services, therefore, the roam management is achieved, which is more beneficial for research on the IMS soft-terminal device, and more beneficial for popularization and application of the IMS network; furthermore, the domain name of the IMS terminal management system is disclosed to the terminal, but all information of the IMS core network does not be disclosed to the terminal, so the security of the IMS network is improved.

Example Embodiment 2

Figure 5:
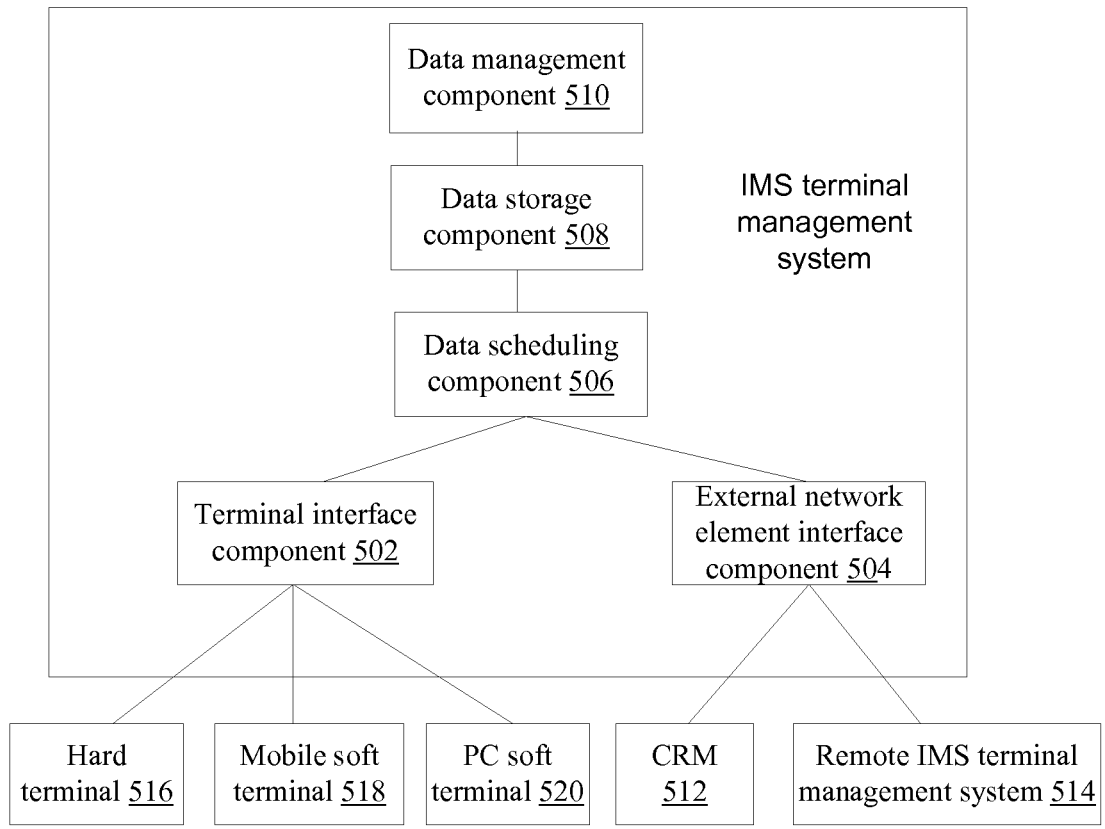
FIG. 5 is a structure diagram of the IMS terminal management system according to a second example embodiment of the disclosure.

FIG. 5 is a structure diagram of the IMS terminal management system according to a second example embodiment of the disclosure; as shown in FIG. 5, the system includes: a terminal interface component 502, an external network element interface component 504, a data scheduling component 506, a data storage component 508 and a data management component 510. Wherein, the network elements of the periphery docking with the terminal interface component 502 and the external network element interface component 504 include: various registered terminals, a home location account opening and closing system 512 (also called Customer Relationship Management (CRM) system) and an opposite end remote IMS terminal management system 514; the various registered terminal may include: a hard terminal 516, a mobile soft terminal 518 and a Personal Computer (PC) soft terminal 520.

Wherein, the terminal interface component 502 is configured to achieve the support for the access of the hard terminal 516, the mobile soft terminal 518 and the PC soft terminal 520, the protocol resolution, the switching function, and providing the capability of authenticating and registering for the terminal, and acquire information of a best IMS network access point according to the register condition of the terminal; the external network element interface component 504 is configured to implement docking with the third interface such as the home location account opening and closing system 512 to meet a requirement for opening and closing an account; the external network element interface component 504 is further configured to dock with other remote IMS terminal management system 514 to meet requirements for synchronizing IP address and system domain name among systems and acquiring the access point BSC address; the data scheduling component 506 is configured to implement data scheduling management and logical judgment processing in system, for example, determine the home location IMS terminal management system of a user according to the registration request from the terminal, and determine the current visit location IMS terminal management system of the user according to the registration request from the terminal; the data management component 510 is configured to implement data configuration, data maintenance and data management; the data storage component 508 is configured to provide the user with services of storing system data, terminal configuration information and other data.

Example Embodiment 3

Figure 6:
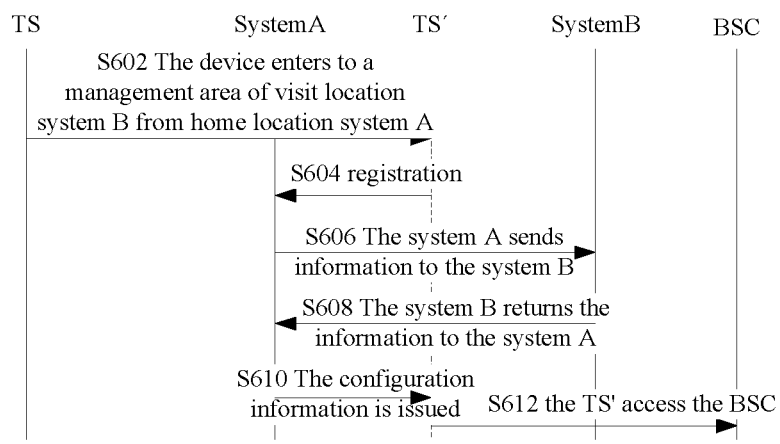
FIG. 6 is a flowchart that an IMS terminal registers at a visit location according to a third example embodiment of the disclosure.

FIG. 6 is a flowchart that an IMS terminal registers at a visit location according to a third example embodiment of the disclosure; as shown in FIG. 6, the device TS and the device TS' are an IMS device, which can be called as IMS terminal, and can further be called as terminal or device, the system is the IMS terminal management system; the home location of a registered account of the device TS is in the system A, the current system domain name of the device TS is the domain name of the system A; the device TS roams into an area managed by the system B and acquires the information such as the BSC address managed by the system B when registering in the area managed by the system B; the terminal accesses the IMS core network at the BSC according to the address issued by the system A. Besides, it should be noted that an arrow in FIG. 6 indicates the way to go, TS indicates the terminal, and TS' indicates the terminal that roams from the system A to the system B.

As shown in FIG. 6, the method includes the following steps.

Step 602: The device TS roams from the system A to the system B, and the device TS becomes the device TS'.

Step 604: The device TS' is in the network managed by the system B and successfully accesses an IP network; the device TS' registers in the system A according to the managed system domain name.

Step 606: The system A verifies the information of the device TS'; after the verification is successful, the system A determines an access system to which the device TS' belongs according to the IP address by which the terminal accesses, and then sends a request message for acquiring the BSC address that the user accesses to an access system B to which the device TS' belongs.

Step 608: The system B acquires the corresponding BSC address information according to the IP address of the terminal sent by the system A and returns the corresponding BSC address information to the system A.

Step 610: The system A receives the BSC address information (domain name or IP address) returned by the system B, generates configuration information of the device TS' according to the BSC address, and issues the configuration information to the device TS'.

Step 612: The device TS' accesses the BSC managed by the system B according to the issued configuration information.

Note that, when the system A fails to acquire information from the system B, the system A directly issues the information of the home location to the device TS', and the device TS' directly goes to the home access point BSC to access the IMS network.

Example Embodiment 4

Figure 7:
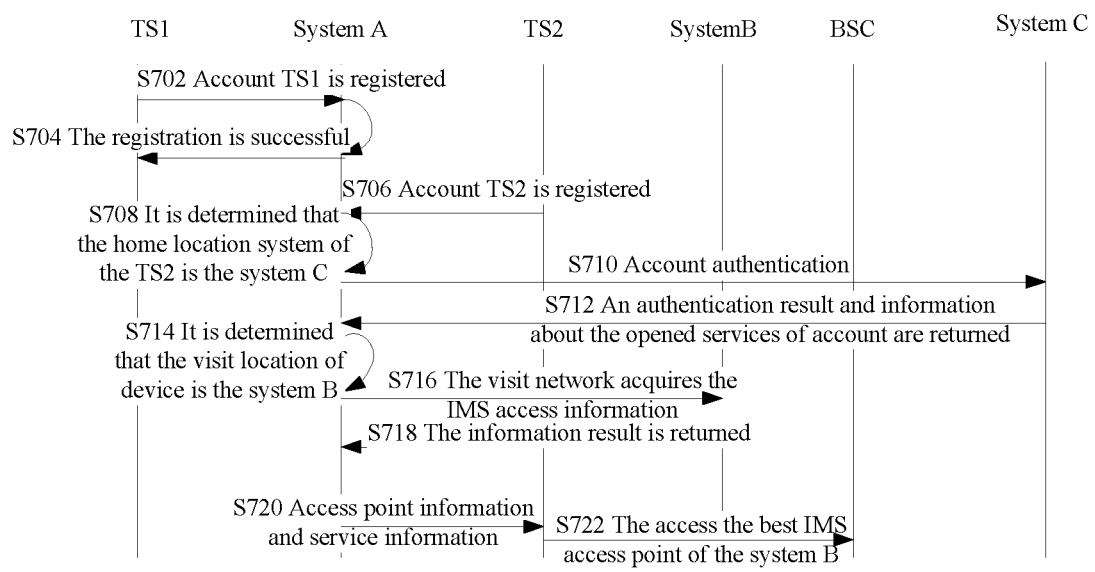
FIG. 7 is a flowchart that an IMS terminal changes account to register at a visit location according to a fourth example embodiment of the disclosure.

FIG. 7 is a flowchart that an IMS terminal changes account to register at a visit location according to a fourth example embodiment of the disclosure; as shown in FIG. 7, the device TS is an IMS device, which can be called as IMS terminal, and can further be called as terminal or device, the system is the IMS terminal management system; the registered account TS1 or the account TS1 belongs to the system A; the registered account TS2 or the account TS2 belongs to the system C.

As shown in FIG. 7, after the device TS, which belongs to the system A, and uses the account TS1 belonging to the system A to register, roams to a network managed by the system B, the method for using the account TS2 belonging to the system C to register in the system B is provided, and the method includes the following steps.

Step 702 to Step 704: When the device TS is used at the first time, the device is preset a real default management system A, the user uses the account TS1 to register and the registration is successful, the registration flow is the same as the flow shown in FIG. 8.

Step 706: The device TS enters the visit network system B, the user uses the account TS2 to register, and the device initiates a registration request to the system A.

Step 708: The system A determines the home location of the account TS2 is the system C according to the registration request.

Step 710: The system A initiates to the system C a request for authenticating identity information of the account TS2.

Step 712: The system A receives an authentication result returned by the system C; when the authentication result is successful, the system C returns the IMS access identity information and the information of the opened services; or else, the system ends registration, and disconnects from the system A.

Step 714: The system A determines that the current visit network system of the account TS2 is the system B according to the registration request.

Step 716: The system A initiates an inquiry for the IMS access information to the system B.

Step 718: The system A receives message returned by the system B and obtains the returned IMS network access information; when the inquiry is failed, the system A directly acquires the information of the best IMS network access point administered by the system A.

Step 720: The system A issues the IMS network access information and the information of the opened services of the account to the device TS.

Step 722: The device TS goes to the best access point BSC to access the IMS network according to the acquired IMS network access information; the registration is ended, and the connection with the system A is disconnected.

Example Embodiment 5

Figure 8:
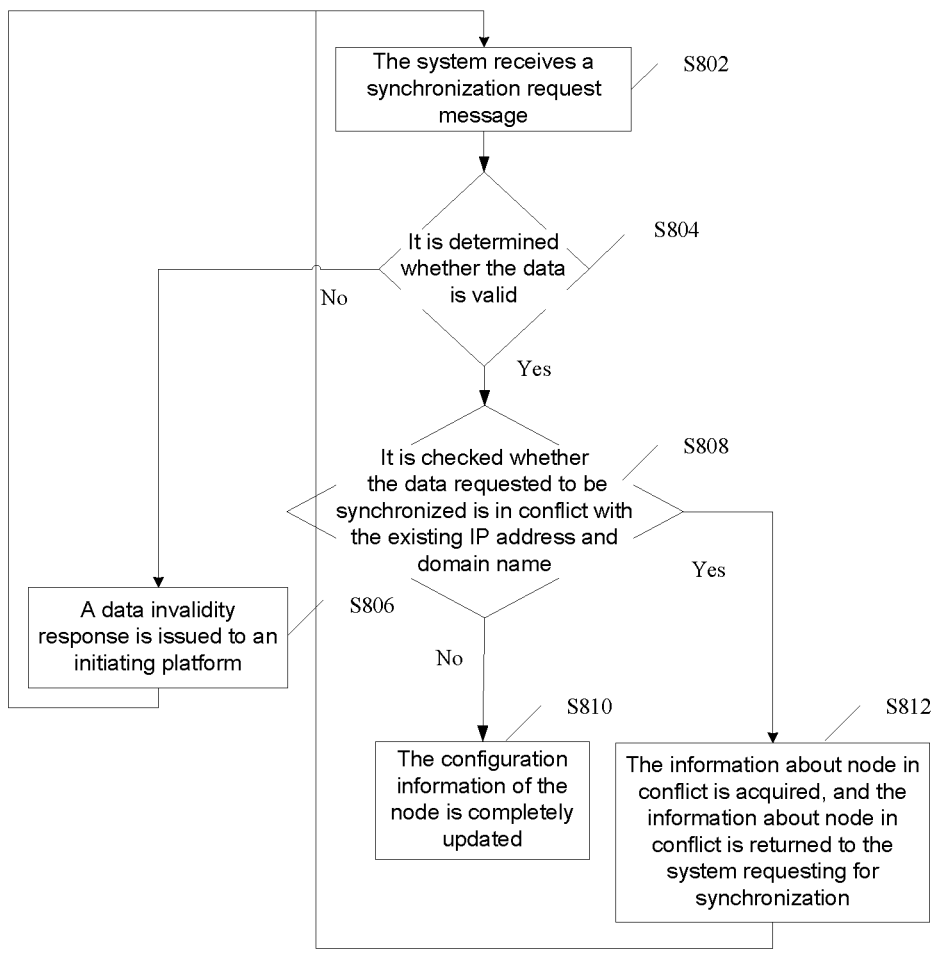
FIG. 8 is a flowchart that data synchronization among the IMS terminal management system according to a fifth example embodiment of the disclosure.

Before the IMS terminal registers in the IMS terminal management system, data can be synchronized among the IMS terminal management systems. FIG. 8 is a flowchart that data synchronization among the IMS terminal management systems according to a fifth example embodiment of the disclosure; both the system and the management system described below are the IMS terminal management system. First of all, determining system needs to adjust the managed data. For example, when managing IP network segment refinement formerly, the system first checks by itself whether the IP network segment is in conflict, when the IP network segment is not in conflict, the system automatically splits the IP network segment and validates the split IP network segment; at the same time, the system sends a synchronization request message to other management systems to request for synchronizing and/or updating data of the system. As shown in FIG. 8, the method includes the following steps:

Step 802: The system receives a synchronization request message from other systems.

Step 804: The data requested to be synchronized by the system which initiates the synchronization request, is checked be valid or not; when the data is invalid, enter Step 806; when the data is valid, enter Step 808.

Step 806: The failure information about invalidity is directly returned to the system which initiates the synchronization request.

Step 808: The system checks whether the data requested to be synchronized by the system which initiates the synchronization request is in conflict with the existing data of the system; when the data is not in conflict, enter Step 810; when the data is in conflict, enter Step 812.

Step 810: The system automatically updates the data requested to be synchronized; for example, when the request is a request for IP network segment refinement, the system automatically refines, according to the synchronization request message, the IP network segment administered by the system which initiates the synchronization request; when the synchronization is successful, the system directly return a success response to the system node which initiates the synchronization request; when the synchronization is failed, enter Step 812.

Step 812: The system acquires node information with data conflict and returns the node information with conflict to the system which initiates the synchronization request; the opposite system, namely the system which initiates the synchronization request, resynchronizes data after adjusting data accurately.

Example Embodiment 6

In the present example embodiment, a soft-terminal program is installed on a mobile device; through the soft-terminal program, it is possible to successfully log in the IMS terminal management system and access the IMS network; the user uses another remote cross-system account to log in. The original account A of the device belongs to the system A and successfully registers in the system A, a new account B belongs to the system B, and the device moves to the scope of administrated by the system C; the device interconnects with computer networks of the systems A, B, C, and the systems A, B, C interconnect with each other; the IP address and the domain name of the opposite end system of each system are complete and correct; for example, the opposite end systems of the system A are the systems B, C, the opposite end systems of the system B are the systems A, C, the opposite end systems of the system C are the systems A, B. Completing roam processing by the system includes the following steps:

Step A: the system A synchronizes through the interface all the IP addresses and domain names administered by the system A to the system B and the system C; the system B and the system C process likewise;

Step B: the account A successfully registers in the system A in the scope of the system A, and then enters into the scope of the system C to use the account B to register;

Step C: the terminal adopts the information of the account B to register in the system A firstly; after receiving the registration information, the system A determines that the account B belongs to the system B according to the account information, and the system A issues the domain name information of the system B to the terminal;

Step D: after receiving the domain name information of the system B, the terminal automatically initiates the registration to the system B; after the system B authenticates that the account B is valid and determines that the terminal is in the scope of the system C according to the accessed IP address, the system B acquires the information about a BSC address nearby the user from the system C, and issues the BSC address and service configuration information to the terminal after acquiring the information about the nearby BSC address; and Step E: the terminal device accesses the nearby BSC according to the BSC address issued by the system B, accesses the IMS core network, and uses services according to the service configuration information.

Note that, in the above process, the user only inputs the user name and the password, the remaining interaction flow automatically runs and completes in the background.

Note that, the steps shown in the flowcharts of the accompanying drawings can be executed in a computer system of a set of machine-executable instructions; besides, although the flowchart shows a logical sequence, in some cases, the shown or described steps can be executed in a sequence different from that described here.

To sum up, according to the above embodiments of the disclosure, a method and device for the IMS terminal to access the network are provided; the method includes that: the IMS terminal management systems synchronize data via an interface; when roaming, the home location IMS terminal management system of the IMS terminal acquires the IMS network access point information of the visit location from the visit location IMS terminal management system of the IMS terminal, and the home location IMS terminal management system sends the configuration information to the IMS terminal, wherein the configuration information includes the acquired IMS network access point information; it is solved the problems in the related art that a terminal cannot acquire an accurate access point and the service roaming management cannot be provided for the terminal, thus enabling the IMS network access point acquired by the IMS terminal to be more accurate, achieving the service roaming management, and improving the security of an IMS network.

Obviously, those skilled in the art should appreciate that the above-mentioned components and steps of the disclosure can be realized by a general-purpose computing device, and they can be centralized in a single computing device or distributed on a network composed of multiple computing devices; optionally, they can be realized by program code which is capable of being executed by the computing device, so that they can be stored in a storage device to be executed by the computing device; or they are made into integrated circuit components, respectively; or multiple components and steps of them are made into a single integrated circuit component to realize. In this way, the disclosure is not limited to any particular combination of hardware and software.

The above is only the example embodiment of the disclosure and not intended to limit the disclosure; for the skilled personnel in the field, the disclosure may have various modifications and changes. Any modifications, equivalent replacements, improvements and the like within the principle of the disclosure shall fall within the scope of the claims of the disclosure.

What is claimed is:

1. A method for an Internet Protocol Multimedia Subsystem (IMS) terminal to access a network, comprising:
   acquiring, by a home location IMS terminal management system of the IMS terminal, IMS network access point information of a visit location from a visit location IMS terminal management system of the IMS terminal, wherein IMS terminal management systems synchronize their respective data via an interface;
   sending, by the home location IMS terminal management system, configuration information to the IMS terminal, wherein the configuration information comprises the acquired IMS network access point information, wherein the IMS terminal management system configures account information, service data and administered IP network segment of all terminals administered by the IMS terminal management system, and configures domain name, administered IP network segment and system feature code of one or more IMS terminal management systems corresponding to the terminals administered by the IMS terminal management system, wherein before receiving, by the IMS terminal management system, a request for synchronizing and/or updating the data from other IMS terminal management systems, and checking, by the IMS terminal management system, whether there is conflict in the IP network segment of the IMS terminal management system, and based on that there is no conflict in an IP network segment, splitting the IP network segment and validating the split IP network segment.

2. The method according to claim 1, wherein acquiring, by the home location IMS terminal management system of the IMS terminal, the IMS network access point information of the visit location from the visit location IMS terminal management system of the IMS terminal comprises:

receiving, by the home location IMS terminal management system, a registration request from the IMS terminal; and acquiring, by the home location IMS terminal management system, the IMS network access point information of the visit location from the visit location IMS terminal management system according to the registration request.

3. The method according to claim 2, wherein acquiring, by the home location IMS terminal management system, the IMS network access point information of the visit location from the visit location IMS terminal management system according to the registration request comprises:

after the home location IMS terminal management system authenticates that the IMS terminal is valid according to the registration request, determining, by the home location IMS terminal management system, the visit location IMS terminal management system according to an Internet Protocol (IP) address by which the IMS terminal accesses;

sending, by the home location IMS terminal management system, an IMS network access point information request message to the visit location IMS terminal management system; and receiving, by the home location IMS terminal management system, the IMS network access point information and service information of the visit location from the visit location IMS terminal management system.

4. The method according to claim 3, wherein before sending, by the home location IMS terminal management system, the configuration information to the IMS terminal, the method further comprises:

integrating according to a predetermined policy of the IMS terminal, by the home location IMS terminal management system, service information of the visit location, the IMS network access point information and information of services subscribed to by the IMS terminal, which is stored by the home location IMS terminal management system, and generating the configuration information.

5. The method according to claim 4, wherein when the home location IMS terminal management system fails to acquire the IMS network access point information, the home location IMS terminal management system directly issues IMS network access point information of the home location to the IMS terminal, wherein the IMS terminal accesses an IMS network according to the IMS network access point information of the home location.

6. The method according to claim 2, wherein when the home location IMS terminal management system fails to acquire the IMS network access point information, the home location IMS terminal management system directly issues IMS network access point information of the home location to the IMS terminal, wherein the IMS terminal accesses an IMS network according to the IMS network access point information of the home location.

7. The method according to claim 2, wherein before acquiring, by the home location IMS terminal management system, the IMS network access point information of the visit location from the visit location IMS terminal management system, the method further comprises:

receiving, by an IMS terminal management system, a request for synchronizing and/or updating data from other IMS terminal management systems, and checking validity of the data requested to be synchronized;

based on that the data requested to be synchronized is valid, checking, by the IMS terminal management system, whether the data requested to be synchronized is in conflict with existing data; based on that the data requested to be synchronized is invalid, returning, by the IMS terminal management system, failure information to said other IMS terminal management systems;

based on that the data requested to be synchronized is not in conflict with the existing data, automatically updating, by the IMS terminal management system, the data requested to be synchronized;

based on that the data requested to be synchronized is in conflict with the existing data, sending, by the IMS terminal management system, node information which is in conflict to said other IMS terminal management systems, wherein said other IMS terminal management systems resynchronize data after adjusting data.

8. The method according to claim 3, wherein when the home location IMS terminal management system fails to acquire the IMS network access point information, the home location IMS terminal management system directly issues IMS network access point information of the home location to the IMS terminal, wherein the IMS terminal accesses an IMS network according to the IMS network access point information of the home location.

9. The method according to claim 3, wherein before acquiring, by the home location IMS terminal management system, the IMS network access point information of the visit location from the visit location IMS terminal management system, the method further comprises:

receiving, by an IMS terminal management system, a request for synchronizing and/or updating data from other IMS terminal management systems, and checking validity of the data requested to be synchronized;

based on that the data requested to be synchronized is valid, checking, by the IMS terminal management system, whether the data requested to be synchronized is in conflict with existing data; based on that the data requested to be synchronized is invalid, returning, by the IMS terminal management system, failure information to said other IMS terminal management systems;

based on that the data requested to be synchronized is not in conflict with the existing data, automatically updating, by the IMS terminal management system, the data requested to be synchronized;

based on that the data requested to be synchronized is in conflict with the existing data, sending, by the IMS terminal management system, node information which is in conflict to said other IMS terminal management systems, wherein said other IMS terminal management systems resynchronize data after adjusting data.

10. The method according to claim 1, wherein when there are multiple different accounts for the IMS terminal and after the IMS terminal has successfully registered in a home location IMS terminal management system of one account and when a current account with a home location different from that of the one account is applied to perform registering, before acquiring, by the home location IMS terminal management system of the IMS terminal, the IMS network access point information of the visit location from the visit location IMS terminal management system, the method further comprises:

receiving, by the home location IMS terminal management system to which IMS terminal management is registered, a registration request from the IMS terminal, and determining a home location IMS terminal management system of the current account according to the registration request;

initiating, by the home location IMS terminal management system to which IMS terminal management is registered, an identity authentication request to the home location IMS terminal management system of the current account;

based on that identity authentication is successful, acquiring, by the home location IMS terminal management system to which IMS terminal management is registered, service information of the current account from the home location IMS terminal management system of the current account, and acquiring the IMS network access point information of the visit location from the visit location IMS terminal management system;

based on that the identity authentication is unsuccessful, ending a registration, wherein the IMS terminal disconnects from the home location IMS terminal management system to which IMS terminal management is registered.

11. The method according to claim 10, wherein when the home location IMS terminal management system fails to acquire the IMS network access point information, the home location IMS terminal management system directly issues IMS network access point information of the home location to the IMS terminal, wherein the IMS terminal accesses an IMS network according to the IMS network access point information of the home location.

12. The method according to claim 1, wherein when the home location IMS terminal management system fails to acquire the IMS network access point information, the home location IMS terminal management system directly issues IMS network access point information of the home location to the IMS terminal, wherein the IMS terminal accesses an IMS network according to the IMS network access point information of the home location.

13. The method according to claim 1, wherein before acquiring, by the home location IMS terminal management system, the IMS network access point information of the visit location from the visit location IMS terminal management system, the method further comprises:

receiving, by an IMS terminal management system, a request for synchronizing and/or updating data from other IMS terminal management systems, and checking validity of the data requested to be synchronized;

based on that the data requested to be synchronized is valid, checking, by the IMS terminal management system, whether the data requested to be synchronized is in conflict with existing data and based on that the data requested to be synchronized is invalid, returning, by the IMS terminal management system, failure information to said other IMS terminal management systems;

based on that the data requested to be synchronized is not in conflict with the existing data, automatically updating, by the IMS terminal management system, the data requested to be synchronized;

based on that the data requested to be synchronized is in conflict with the existing data, sending, by the IMS terminal management system, node information which is in conflict to said other IMS terminal management systems, wherein said other IMS terminal management systems resynchronize data after adjusting data.

14. The method according to claim 1, wherein the IMS network access point information is Base Station Controller (BSC) address information corresponding to an IP address by which the IMS terminal accesses.

15. The method according to claim 1, wherein when the home location IMS terminal management system fails to acquire the IMS network access point information, the home location IMS terminal management system directly issues IMS network access point information of the home location to the IMS terminal, wherein the IMS terminal accesses an IMS network according to the IMS network access point information of the home location.

16. A device for an Internet Protocol Multimedia Subsystem (IMS) terminal to access a network, which is applied to an IMS terminal management system, comprising:

a hardware processor, configured to perform programming components stored in a memory, wherein the programming components comprise:

an acquiring programing component, coupled with a sending programing component and is configured to acquire IMS network access point information of a visit location from a visit location IMS terminal management system of the IMS terminal, wherein IMS terminal management systems synchronize their respective data via an interface; and the sending programing component, coupled with the acquiring programing component and configured to send configuration information to the IMS terminal, wherein the configuration information comprises the acquired IMS network access point information, wherein the hardware processor further comprising: an integrating programing component, coupled with the acquiring component and configured to integrate, according to a predetermined policy of the IMS terminal, service information of the visit location, the IMS network access point information and information of services opened for the IMS terminal, which is stored by the home location IMS terminal management system; and a generating programing component, coupled with the integrating programing component and configured to generate the configuration information, wherein before receiving, by the IMS terminal management system, a request for synchronizing and/or updating the data from other IMS terminal management systems, and checking, by the IMS terminal management system, whether there is conflict in the IP network segment of the IMS terminal management system, and based on that there is no conflict in an IP network segment, splitting the IP network segment and validating the split IP network segment.

\* \* \* \* \*